Sept. 25, 1951      E. G. HARTDORN      2,568,732
REMOVABLE ENDLESS TRACK PAD
Filed June 21, 1949
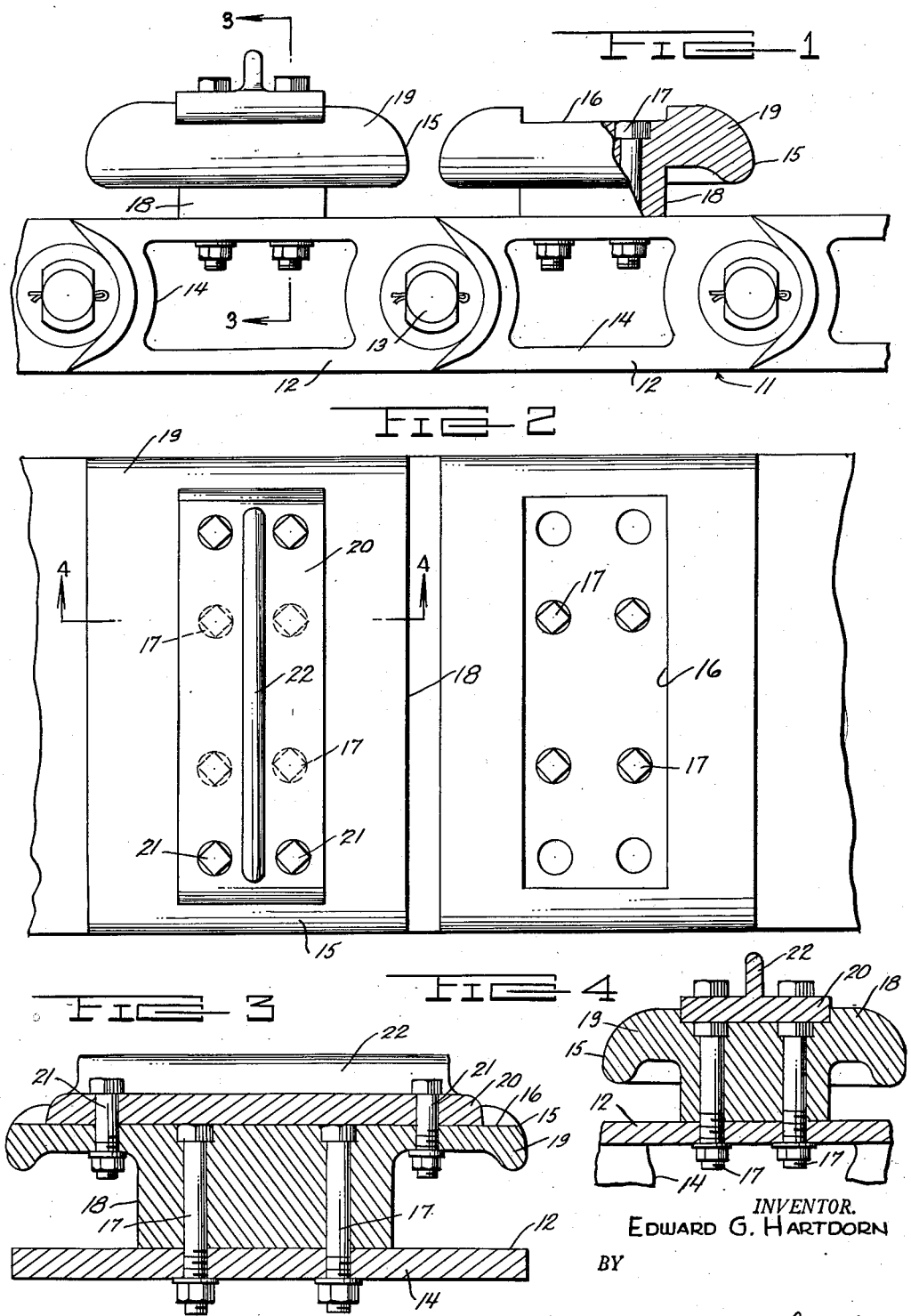
INVENTOR.
EDWARD G. HARTDORN
BY
McMorrow, Berman & Davidson
ATTORNEYS Patented Sept. 25, 1951

2,568,732

UNITED STATES PATENT OFFICE 2,568,732

REMOVABLE ENDLESS TRACK PAD

Edward G. Hartdorn, Dover, N. J.

Application June 21, 1949, Serial No. 100,458

2 Claims. (Cl. 305—10)

This invention relates to tractors of the tracklaying type, and more particularly to removable pad or shoe structures for endless track tractors.

A main object of the invention is to provide a novel and improved pad structure for an endless track tractor, which is very simple in construction, which is formed to provide a smooth contour on the ends of the pads permitting the endless track tractor to turn smoothly from side to side and to relieve the torque usually set up in the machine frame caused by turning movements of the tractor, and wherein the gripping elements of the pads are readily removable enabling the tractor to ride on road surfaces without damage to said road surfaces.

A further object of the invention is to provide an improved tractor pad of the type having a removable ground gripping element, said pad being adaptable to various types of track-laying machines, wherein the ground gripping element of the pad may be easily removed to avoid unnecessary damage to road surfaces, and wherein the ground gripping element may be readily replaced to enable the endless track tractor to travel over soft surfaces.

Further objects and advantages of the invention will become apparent from the following description and claims, and from the accompanying drawings, wherein:

Figure 1 is a fragmentary side elevational view partly in cross section of a portion of an endless track provided with improved pad elements according to the present invention.

Figure 2 is a top plan view of the portion of track shown in Figure 1.

Figure 3 is a cross sectional view taken on line 3—3 of Figure 1.

Figure 4 is a cross sectional view taken on line 4—4 of Figure 2.

Referring to the drawings, 11 designates a portion of the articulated track of an endless track tractor or other vehicle of the track-laying type. The track 11 comprises successive links 12 pivotally connected together by transverse hinge pins 13 to define an endless track or belt which is mounted on the tractor in the customary manner and driven by the tractor prime mover. Each segment 12 of the track is formed with side recesses 14.

Secured to each segment 12 by fastening elements or bolts 17, 17 passing through the top walls of the side recesses 14, 14, as shown in Figures 1 and 3, is a pad member 18, said pad member being formed with a top flange 19 around its periphery. The flange 19 is smoothly rounded at its outer edge portion, as shown at 15. The top of each pad member 18 is formed with a transverse groove 16. Designated at 20 is a removable ground engaging element which is seated in groove 16 and which is secured to pad member 18 by other fastening elements or corner bolts 21 passing through the pad flange 19. The element 20 is formed with an elongated ground engaging rib 22, enabling traction to be developed by the track segments when the machine is employed on soft ground. The ground gripping elements 20 are readily removed by unfastening the bolts 21.

When the machine is to be employed on hard surfaces, such as when traveling over a road or pavement, the ground gripping elements 20 are removed, as above described. The rounded flange edge portions 15 provide a smooth pad contour permitting the machine to turn smoothly from side to side and relieving the torque set up in the machine frame by such turning movements. The removal of the ground gripping elements 20 prevents unnecessary tearing up of road surfaces when the machine is traveling thereover. The gripping elements 20 may be readily replaced whenever soft ground surfaces are encountered.

While a specific embodiment of an endless track tractor tread pad has been disclosed in the foregoing description, it will be understood that various modifications within the spirit of the invention may occur to those skilled in the art. Therefore, it is intended that no limitations be placed on the invention except as defined by the scope of the appended claims.

What I claim is:

1. A shoe structure for attachment to a link of an endless track comprising a pad member superimposed upon said link and secured thereto, the bounding edges of said pad member being smooth, there being a transverse groove in the upper face of said pad member, a transversely disposed ground engaging element positioned within said groove of said pad member and secured to the latter member, and a projecting rib on the upper face of and transversely of said ground engaging element.

2. A shoe structure for attachment to a link of an endless track comprising a pad member superimposed upon said link, fastening elements carried by said pad member extending through said link and secured thereto, the bounding edges of the said pad member being smooth, there being a transverse groove in the upper face of said pad member, a transversely disposed ground engaging element positioned within said groove of said pad member, other fastening elements extending through said ground engaging element and said pad member and secured to said pad member, and a projecting rib on the upper face of and extending transversely of, said ground engaging element.

EDWARD G. HARTDORN.

REFERENCES CITED

The following references are of record in the file of this patent:

UNITED STATES PATENTS

| Number | Name | Date |
|---|---|---|
| 1,314,722 | White | Sept. 2, 1919 |
| 1,503,611 | Springer | Aug. 5, 1924 |

FOREIGN PATENTS

| Number | Country | Date |
|---|---|---|
| 136,815 | Great Britain | Dec. 19, 1919 |
| 538,585 | Great Britain | Aug. 8, 1941 |